J. Stimpson,
Dovetailing Machine.
N°26,060.                    Patented Nov. 8, 1859.
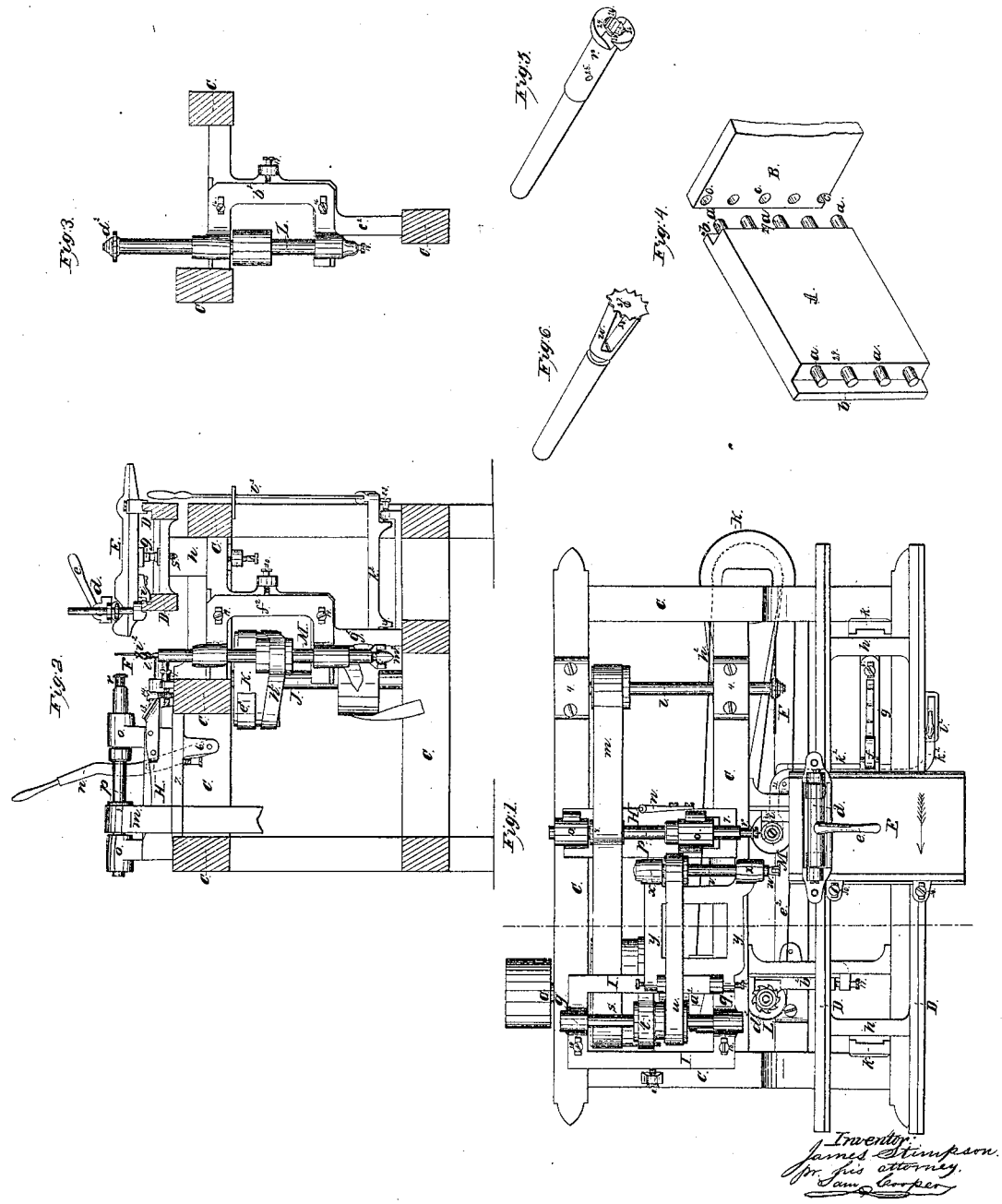
Inventor:
James Stimpson.
pr his attorney
Sam Cooper

UNITED STATES PATENT OFFICE.

JAMES STIMPSON, OF BALDWINVILLE, MASSACHUSETTS.

MACHINE FOR MAKING BOX-JOINTS.

Specification of Letters Patent No. 26,060, dated November 8, 1859.

*To all whom it may concern:*

Be it known that I, JAMES STIMPSON, of Baldwinsville, in the county of Worcester and State of Massachusetts, have invented an improved Machine for Making a Drawer or Box-Joint, of which the following is a full, clear, and exact description, reference being had to the accompanying drawings, making part of this specification, in which—

Figure 1 is a plan of the machine. Fig. 2, a vertical section through the machine on the line $x$, $x$, of Fig. 1. Fig. 3, a view of one of the cutter shafts and the frame which carries it. Fig. 4, a view of my improved box joint. Figs. 5, 6, details to be referred to hereafter.

My present invention consists in a machine for making an improved joint for joining or putting together boxes—drawer furniture and other articles,—for which joint I obtained Letters Patent of the United States the third day of February 1857, and which is shown in Fig. 4, where—

A represents the front and B, the side of a drawer. On the piece A, are formed a series of round tenons $a$, which enter corresponding holes $c$ in the piece B. A lap or rabbet $b$ is formed on the piece A, in the thickness of the stuff—which laps over the end of the piece B, when in place, the whole forming a snug and strong joint.

That others skilled in the art may understand and use my invention I will proceed to describe the manner in which I have carried it out.

In the said drawings C is the frame of the machine to the top of which are secure the ways D. A carriage E slides back and forth on these ways, and has attached to it a clamp $d$, for holding the piece of stuff to be operated on down firmly on the carriage. This clamp is simply an eccentric which is thrown over by a handle $e$. A pawl $f$, on one side of the carriage engages with a rack $g$, attached to the frame of the ways D. The notches in this rack correspond with the distances that the pins and holes in the work are intended to be apart from the center of one pin or hole to the center of the next, the rack is adjustable in position by a screw and slot 5.

The ways D, may be adjusted in height above the frame of the machine in the following manner. The cross braces $h$, of the ways slide in grooves in the cross pieces $k$ at each end of the frame C and are raised and lowered by set screws 3. A cleat attached to the under side of the carriage E, runs in a groove $i$ in the side of one of the ways D, and prevents the carriage from being thrown off the ways.

A shaft $l$, having its bearings at 4, on the frame C, carries at one end a circular saw F, for cutting off the stuff to the proper length and squaring the ends of it. This shaft is driven by a belt $m$, from a pulley on the main or driving shaft G.

A block H slides back and forth a short distance transversely of the machine on a dove-tail way on a cross brace 7 of the frame C, and is moved by a hand lever $n$, which is pivoted to it and to a stud 6 projecting down from the cross brace 7. From the block H rise two heads $o$, in which runs a shaft $p$, which is driven by the belt $m$ passing over a pulley 8. This shaft carries a hollow bit $r$, (shown detached of full size in Fig. 5) which forms the tenon $a$ Fig. 4. It is brought up by the operator by means of the hand lever $n$, as each tenon is formed. A screw 9, which passes through a small stud rising from the frame C, serves as a stop to regulate the motions of the block H, and consequently the depth to which the bit $r$ shall penetrate the stuff.

A frame I, is secured to the top of the frame C, by screws and slots 10, and is adjusted in position by a set screw 11 passing through a stud on the frame C. From this frame I, rise the heads $q$, in which runs a shaft $s$, carrying two pulleys one of which is driven by a belt $t$, from a drum on the main shaft G; the other carries a belt $u$, which drives a shaft $v$. This shaft carries a cutter $w$, (shown detached of full size in Fig. 6,) which cuts away the wood between the tenons $a$. This shaft runs in heads $x$, on a swinging frame $y$, which is pivoted at 12 to the frame I. This allows the cutter $w$ to be raised and lowered without slacking the belt $u$.

A wedge 13 on the side of the block H, (see Fig. 2) lifts the end of the frame $z$, and the cutter $w$, each time the block H, is brought forward by the lever $n$, and the cutter $w$ operates between two of the tenons $a$, which have been previously formed by the bit $r$. The frame $y$, when down rests on a screw 14 (Fig. 2) in the frame C,—so that the distance to which it can drop may be adjusted.

A pulley $a^2$, on the shaft G carries a belt which drives a vertical shaft J, at the opposite end of the machine, this shaft is supported in suitable bearings attached to the frame C,—and carries a drum K.

A vertical shaft L has its bearings in a frame $b^2$ (Fig. 3,) which is secured by screws and slots 16 to an upright brace $c^2$ attached to the frame C. A set screw 17 passes through a stud projecting from the brace $c^2$ so that the position of the frame $b^2$ may be adjusted to bring the shaft L, nearer to or farther from the path of the carriage E, a set screw 18 in the bottom of the step of the shaft L allows it to be raised or lowered. This shaft carries at its upper end a cutter $d^2$ against which the stuff is brought after the tenons $a$ have been formed, and the balance of the wood not taken out by the cutter $w$ is now cleared away above the tenons, leaving the rabbet $b$, Fig. 4. This shaft is driven by a belt $e^2$ from the drum K.

I will now describe the machinery by which the holes $c$, in the piece B, Fig. 4 are bored. This piece is clamped to the carriage E, which is moved by hand in the direction of its arrow the same as in the former case when cutting the tenons. The rack $g$ serves to regulate the distance between the holes. A shaft M has its bearings in a frame $f^2$ Fig. 2 which is secured by screws and slots 19 to an upright brace $g^2$ attached to the frame C. A set screw 20 passes through a stud projecting from the brace $g^2$, by which the position of the frame $f^2$ may be varied laterally to adjust the shaft M, nearer to or farther from the carriage E. This shaft carries at its upper end an auger bit $i^2$ for boring the holes $c$ of a proper size to receive the tenons $a$.

The shaft M, is driven by a belt $h^2$ from the drum K, and is raised and lowered vertically in the following manner:—A rock shaft $k^2$ is held in bearings rising from the lower part of the frame C, and is rocked by a hand lever $l^2$ which rises up alongside of the machine at its front near where the operator stands. The inner end of this rock shaft is bent around at 21, and is formed into a fork in which is pivoted the socket or step $m^2$. The foot of the shaft M, rests in this step and is raised and lowered as the hand lever $l^2$ is vibrated. The screw bearings 22, of the rock shaft $k^2$ are adjustable so that it may be moved laterally to accord with the adjustment of the frame $f^2$ to keep the shaft M vertical.

The hollow bit $r$ is of the form shown in Fig. 5, the cutting edges 23 act as a common bit, while the thin notched edge 24 which surrounds the axis of the bit is sufficiently in advance of the cutting edges to act as a center would do in a common bit, and to insure a clean cut for the tenon; a small hole 25 at the bottom of the hollow 26 in the center of the bit enables the operator to clear it of dust by blowing through it. If the size of the tenons is to be varied this bit is changed.

The cutter $w$ (Fig. 6) is made with a small saw 27 at its end, of a little greater diameter than the body of the cutter which decreases a little in size as it recedes from the saw; a slot 28 is cut through it back from the saw, the edges of this slot are filed up sharp and act as cutters when the tool is lifted up into the stuff in the manner before described. The cutter $d^2$ is simply a saw of sufficient thickness to occupy the space between the pins $a$, and rabbet $b$, or so much of it as is necessary to clear out the wood not cut by the bit $r$, and cutter $w$.

The following is the operation of this machine. The position of the several tools having been properly adjusted, the piece of stuff (for example the end of a drawer like A, Fig. 4) is placed on the carriage E, and is clamped to it by turning down the handle $e$, of the clamp $d$. This is done when the carriage is at the end of the ways, to the extreme right of the machine. The carriage is now pushed along to the left past the saw F, which squares the end of the stuff, which is now passed over the cutter $w$ which is set so that the saw 27 on the end of it will mark or score the stuff on a line with the bottom of the tenons and leave a smooth edge at 29, (Fig. 4). The stuff is then brought opposite to the bit $r$, the pawl $f$ drops into one of the notches of the rack $g$ which has been previously adjusted to form the first tenon at the proper distance from the edge of the stuff, the length of the teeth of the rack regulating the distance between the tenons; the bit $r$, is now brought forward by means of the hand lever $n$, and a pin or tenon is formed by the bit which penetrates the stuff to the depth allowed by the adjustment of the screw 9. The lever $n$ is then pushed back and the carriage E is moved forward in the direction of its arrow one notch of the rack $g$, when another tenon is formed, and this operation is repeated until tenons have been made across the width of the piece A.

Each time the block H is brought forward by the hand lever $n$, the wedge 13 attached to the side of this block raises the swinging frame $y$. When the carriage E has progressed far enough to bring the cutter $w$ between the first and second tenons already formed, this cutter takes out the wood between the tenons which was not cut by the bit $r$. This is repeated as often as necessary. The stuff is then brought against the cutter $d^2$ which is set to pass above the tenons and clear the balance of the wood not taken by the cutter $w$, and bit $r$. This leaves the rabbet $b$, with a straight square side to fit the end of the piece B. The piece A, is now reversed and its other end finished in the same way when it is removed from the carriage E and is replaced by the piece B, which is squared by the saw F, and then brought over the auger bit $i^2$ which is raised by means of the hand lever $l^2$, and a hole is bored. This is repeated until all the holes $c$, (Fig. 4) have been bored to correspond with the tenons $a$. The rack $g$ again regulates these spaces as it did with the tenons. The piece B, is then reversed and holes $c$, bored in the other end of it.

When one end of the piece of stuff has been finished and the other end is turned around to be operated upon it is desirable to make the pins and holes corresponding in position with those first made. For this purpose one side of the carriage E, is made adjustable by screws and slots 30.

When the work is to be made deeper from the end of the stuff the circular saw F, is set back by means of collars on its shaft not shown in the drawings. When the tenons $a$, are to be made closer together, the position of the cutter $w$ must be adjusted by moving the frame I, nearer to the block H.

The several parts of this machine for performing the various operations may be made in separate machines, but I prefer to embody them in one machine as above described.

What I claim as my invention and desire to secure by Letters Patent is—

1. I claim the combination of the hollow bit $r$, the cutters $w$ and $d^2$, or their equivalents operating as set forth to form the tenons $a$.

2. In combination with the above I claim the auger bit $i^2$, operating as described to form the holes $c$, to correspond with the tenons $a$ as set forth.

JAMES STIMPSON.

Witnesses:
  LEVI N. SMITH,
  W. S. RODIMON.